US012611729B2

(12) United States Patent
Walde et al.

(10) Patent No.: US 12,611,729 B2
(45) Date of Patent: Apr. 28, 2026

(54) METHOD FOR LASER PROCESSING AND LASER PROCESSING SYSTEM

(71) Applicant: Precitec Gmbh & Co. KG, Gaggenau (DE)

(72) Inventors: Tom Walde, Offenburg (DE); Matthias Werner, Ann Arbor, MI (US); Martin Hochberg, Bruchsal (DE); Li Wen Chang, Rastatt (DE)

(73) Assignee: Precitec GmbH & Co. KG, Gaggenau (DE)

( * ) Notice: Subject to any disclaimer, the term of this patent is extended or adjusted under 35 U.S.C. 154(b) by 295 days.

(21) Appl. No.: 18/592,904

(22) Filed: Mar. 1, 2024

(65) Prior Publication Data

US 2024/0293891 A1 Sep. 5, 2024

(30) Foreign Application Priority Data

Mar. 3, 2023 (DE) ..................... 10 2023 105 231.4

(51) Int. Cl.
B23K 26/03 (2006.01)
B23K 26/082 (2014.01)
G06T 7/564 (2017.01)

(52) U.S. Cl.
CPC .......... B23K 26/032 (2013.01); B23K 26/082 (2015.10); G06T 7/564 (2017.01); *G06T 2207/20024* (2013.01); *G06T 2207/20221* (2013.01); *G06T 2207/30164* (2013.01)

(58) Field of Classification Search
CPC .... B23K 26/032; B23K 26/082; G06T 7/564; G06T 2207/20024; G06T 2207/20221; G06T 2207/30164
See application file for complete search history.

(56) References Cited

U.S. PATENT DOCUMENTS

| | | | | |
|---|---|---|---|---|
| 2016/0086343 A1* | 3/2016 | Namiki | .................. | G06V 10/60 |
| | | | | 348/135 |
| 2018/0297147 A1* | 10/2018 | Nishikawa | ........... | B23K 26/032 |
| 2020/0262004 A1* | 8/2020 | Moser | .................. | B23K 26/702 |

FOREIGN PATENT DOCUMENTS

| | | | | | |
|---|---|---|---|---|---|
| CN | 112161565 A | * | 1/2021 | ............. | G01B 11/02 |
| DE | 603 05 183 T2 | | 3/2007 | | |
| DE | 10 2015 011 914 A1 | | 3/2016 | | |
| DE | 11 2022 000 320 T5 | | 9/2023 | | |
| KR | 102173946 B1 | | 11/2020 | | |

* cited by examiner

*Primary Examiner* — Ming Shui
(74) *Attorney, Agent, or Firm* — DINSMORE & SHOHL LLP

(57) ABSTRACT
A method and a laser processing system are for laser processing a workpiece by a laser beam. The method includes: recording an image of the workpiece with a camera, the beam path of which is coaxially coupled into a beam path of the laser beam and runs together with the beam path of the laser beam via a scanning device; determining a respective contour point for each measuring line of a plurality of measuring lines which are laid through an expected contour path of the workpiece in the recorded image; determining an actual contour path of the workpiece based on the determined contour points; and controlling the scanning device for positioning the laser beam for laser processing based on the actual contour path.

19 Claims, 9 Drawing Sheets

Record an image — S10

Recordings complete?          N

Y

Merge the images — S10a

Arrange measuring lines — S20

Determine contour points — S30

Determine the actual contour path — S40

Control the scanning device and laser processing of the workpiece — S50

Record an image — S10

Arrange measuring lines — S20

Determine contour points — S30

Determine a portion of the actual contour path — S40a

Control the scanning device and laser processing of the workpiece — S50

Processing complete?    N

Y

METHOD FOR LASER PROCESSING AND LASER PROCESSING SYSTEM

CROSS-REFERENCE TO RELATED APPLICATION

This application claims priority to German Application No. 10 2023 105 231.4, filed Mar. 3, 2023, which is hereby incorporated by reference in its entirety.

FIELD OF THE INVENTION

The present disclosure relates to machine vision in laser processing, in particular to a method for laser processing a workpiece by means of a laser beam, in which an actual contour path of the workpiece is determined visually or optically, and to a laser processing system arranged for performing the method.

BACKGROUND OF THE INVENTION

In the context of laser material processing, an X-Y galvo scanning system is often used to control the trajectory of the laser beam. However, an expected or assumed contour path, which is used to determine the trajectory, often deviates from the actual contour path of the workpiece. In order to direct the laser beam precisely to the desired position, the position and orientation of the workpiece and information about the actual geometry of the workpiece must be detected.

KR 102173946 B1 describes a coaxial vision system for laser processing for cutting a display panel, in which a laser is beamed through a laser scanner onto a display panel.

Various laser processing applications require a positioning accuracy of the laser beam of less than 100 µm. However, this is a challenging task due to manufacturing techniques and the associated manufacturing tolerances of workpieces. For example, the geometry of a workpiece to be processed by laser may not correspond to the ideal geometry intended in a moulding process. For example, a circular object may be deformed into an ellipse. In such cases, not only the position and orientation of the workpiece would have to be determined using image processing, but also the entire geometry of the workpiece. Another challenge is that sometimes the workpiece is larger than the camera's field of view. Typically, the size of the field of view or image field of a coaxial camera is only a fraction of the size of the entire scan field (processing field). For example, the scan field of larger optics can reach a diameter of 400 mm, while the field of view of the camera can be smaller than 30 mm.

SUMMARY OF THE INVENTION

One task of the present invention is therefore to provide a method for laser processing and a laser processing system arranged for performing the same in order to improve the precision of a laser processing process performed along a contour path of a workpiece.

A further task is to provide a method for laser processing and a laser processing system arranged for performing the same to enable precise laser processing along a contour path of a workpiece even when the contour has shape deviations from an expected contour.

A further task is to provide a method for laser processing and a laser processing system arranged for performing the same, in order to relax the tolerance requirements for the positioning of a workpiece to be processed along a contour path with a laser beam.

Furthermore, a further task of the present invention is to provide a method for laser processing and a laser processing system arranged for performing the same in order to increase the speed and precision of a determination of a processing path on which the laser beam is to be positioned for laser processing along a contour path of a workpiece.

A further task is to provide a method for laser processing and a laser processing system arranged for performing the same, wherein a laser processing trajectory must follow a contour of the object or workpiece and the object can have an arbitrary or variable shape and size (possibly within certain limits).

One or more of these tasks are solved by a method for laser processing a workpiece by means of a laser beam and a laser processing system as disclosed herein. Preferred embodiments are also disclosed.

The invention makes use of a coaxial arrangement of the camera on the laser processing head. The invention is based on determining the actual contour path from an image of the workpiece or workpiece area recorded by the camera, on the basis of which the laser machining process is to be performed. The actual contour path is determined based on one-dimensional measuring lines that intersect an expected contour path in the recorded image.

A contour point is determined for each measuring line, for example by evaluating the recorded image data (e.g. grey value or intensity value) along the measuring line. The contour point describes the position of the actual contour (or the actual contour path) on the measuring line. In other words, the contour point corresponds to a point of intersection of the actual contour path with the respective measuring line. The contour point can be determined from the recorded image based on predefined criteria for evaluating the measuring line, which are defined according to the type of contour or contour path (outer edge of the workpiece, joining edge, gap, elevation). The contour points therefore correspond to the actual contour path, which may deviate from the expected contour path. According to one embodiment, the entire geometry of the workpiece or the contour path can be determined by a combination of galvanometer movement (scan movement) and image information detected by the camera.

Laser processing is therefore not based on a predefined (expected) contour path, but on a determined actual contour path. The expected contour path is therefore only used to arrange the measuring lines in a suitable manner in the recorded image, namely in such a way that each measuring line runs through the expected contour path, i.e. intersects it. This makes it possible to precisely measure the geometry of the workpiece and to control or regulate the laser processing accordingly. As a result, for example, the requirements for the manufacturing tolerances of the workpiece and/or the requirements for the exact positioning of the workpiece to be processed can be reduced.

To determine the contour path, the recorded image is only analysed along the measuring lines, i.e. one-dimensionally, so to speak. Therefore, considerable increases in speed can be achieved compared to conventional image processing techniques in which an entire camera image is analysed in a time-consuming computational process, such as a Hough transformation.

According to one aspect of the invention, a method for laser processing a workpiece by means of a laser beam comprises the steps of: recording an image of the workpiece with a camera, the beam path of which is coaxially coupled into a beam path of the laser beam and runs together with the beam path of the laser beam via a scanning device; determining a respective contour point for each measuring line of a plurality of measuring lines which are laid in the recorded image by an expected contour path of the workpiece; determining an actual contour path of the workpiece based on the determined contour points; and controlling the scanning device to position the laser beam for laser processing based on the actual contour path.

This determination of the actual contour path is particularly advantageous in situations where the tolerance requirements for laser processing are very strict and/or where the shape of the workpiece changes from one workpiece to the next. As it is not necessary to record a new image for each contour point, the process is also very time and computationally efficient.

An optical path of the coaxially coupled or arranged camera runs partly together with the optical path of the processing laser beam. For example, the camera looks at a (comparatively small) field of view that is reflected by the scanning device (e.g. galvo mirrors). By controlling the scanning device (e.g. moving the galvo mirrors), it is possible for the camera to see all locations of the entire scan field or processing field.

The workpiece is also referred to herein as an object. The method may comprise one or more of the following features according to an exemplary embodiment.

Recording an image with the camera may comprise recording the image. The image comprises a plurality of pixels. The pixels may be arranged in a grid pattern. The pixels each comprise an intensity value, for example a grey value. For example, the image may be a grey value image (grey image) or the camera may be a grey image camera. The image is two-dimensional. The camera's field of view detects at least part of the workpiece. The beam path of the camera can be described as the observation beam path of the camera. It corresponds to the optical path of the camera. The image can be referred to as the camera image.

For example, the beam path of the camera can be coupled into the beam path of the laser beam by a coupling optic. The coupling optics can comprise a beam splitter, for example a dichroic mirror.

The scanning device can also be generally referred to as a scanner or laser scanner. The scanning device can be arranged to deflect the laser beam over a scan field. The scanning device can be a galvo scanner, also known as a galvanometer scanner or X-Y galvo scanning system. A galvo scanner comprises at least one deflection element that is moved galvanometrically, in particular rotated. The deflection element can be a scanning mirror. A scanning mirror is generally referred to as an optical element with a mirror-like (reflective) surface. The scanning mirror can also be referred to as a sampling mirror. The deflection element or the scanning mirror can be rotated about at least one axis.

The control of the scanning device can comprise control and/or regulation, i.e. in particular control without feedback and/or regulation with feedback. The control of the scanning device for positioning the laser beam for laser processing can be a control of the scanning device for positioning or guiding the laser beam for laser processing along the determined actual contour path. The control of the scanning device for positioning the laser beam for laser processing can, in particular, be a guiding of the laser beam for laser processing along a laser processing trajectory. The laser processing trajectory can also be referred to as a laser trajectory or laser processing path. The laser processing trajectory can run along the determined actual contour path or correspond to the determined actual contour path. The laser processing trajectory can be determined based on the determined actual contour path.

A processing path for the laser beam can be defined based on or corresponding to the actual contour path. The scanning device for positioning the laser beam for laser processing can be controlled during laser processing of the workpiece. The laser beam can be referred to as the processing laser beam.

The actual contour path can be a continuous or quasi-continuous contour path. For example, the actual contour path can be defined by discrete points, e.g. the determined contour points (possibly after coordinate transformation into system coordinates), and interpolated intermediate points or intermediate distances. The interpolation can be a linear interpolation. Alternatively, intermediate points can be calculated using a curve and/or arc line fitting algorithm. Outliers among the contour points can be removed via limits to be defined.

The measuring lines can run through or intersect the expected contour path. In particular, the measuring lines can run vertically or transversely through the expected contour path.

The measuring lines can run through or intersect the expected contour path at a uniform distance. The measuring lines can be arranged at a distance from one another, in particular at a distance from one another along the expected contour path. The plurality of measuring lines can comprise measuring lines in different orientations and/or alignments. The measuring lines can be straight or have any predetermined shape. For example, the measuring lines can have a predetermined length or a predetermined number of pixels. The measuring lines can also be referred to as measuring strips. They are each one-dimensional, i.e. one-dimensional in relation to their respective direction. The measuring lines arranged in an image or all measuring lines can have the same length and/or shape and/or the same distance to neighbouring measuring lines.

By arranging the measuring lines in the recorded image, the expected contour path in the image is thus scanned or checked at discrete, spaced-apart locations. The image is therefore scanned along the measuring lines. Image data (i.e. grey value data or intensity data) along the measuring lines can also be referred to as line profiles. The measuring lines can be regarded as virtual lines that are superimposed on the image. The orientation and/or position of the respective measuring line can be defined in the image to run through the expected contour path. An orientation and/or position of the respective measuring line can be calculated based on the expected contour path. The measuring lines can each have an individual orientation and/or position. The distance between the measuring lines can be parameterised, i.e. the distance between the measuring lines can be determined based on a parameter that can be selected by a user. The length of the measuring lines can be parameterisable, i.e. the length of the measuring lines can be determined based on a parameter that can be selected by a user. For example, the number and the respective position of the measuring lines can be selected such that at least one measuring line is used for each millimetre of the expected contour path, or that at least one measuring line is used for each millimetre of the expected contour path, or at least in a region where the expected contour path has a curvature. At least two measuring lines can be used for each millimetre. This allows the contour path to be detected at finely discretised contour points so that the shape of the actual contour path is well detected.

The method can include: reading out the expected contour path from a memory, for example a memory of a laser processing system or a memory of a control device of the laser processing system.

A contour point can be determined by image processing of the recorded image along the respective measuring line, in particular image processing only along the measuring line. In particular, the method can include extracting or sampling image data (e.g. grey value data or intensity data) along each measuring line, i.e. extracting a line profile along each measuring line, and evaluating the image data to determine the contour point on the respective measuring line. Sampling or scanning can weight multiple pixels along the transverse direction of the measuring line, e.g. taking the average value of three neighbouring pixels in the transverse direction to reduce signal noise. The contour point can be determined, for example, using a predefined criterion, in particular a predefined criterion for recognising the position of the contour on the measuring line (i.e. the point at which the actual contour path crosses the measuring line). The contour point can therefore be determined from the recorded image based on a predetermined criterion for evaluating the line profile, which is defined according to the type of contour or the type of contour path (outer edge of the workpiece, joining edge, gap, elevation). The predefined criterion can, for example, comprise an intensity maximum or brightness maximum, or an intensity minimum or brightness minimum, or an intensity increase or brightness increase in relation to a direction of the measuring line, or an intensity decrease or brightness decrease in relation to a direction of the measuring line, or a combination of a first criterion with at least one second criterion of the aforementioned criteria with a predefined sequence along a direction of the measuring line. An intensity minimum or brightness minimum can, for example, correspond to a joining edge, in particular a joining edge between two parts or regions of the workpiece.

An intensity maximum or brightness maximum or an intensity increase or brightness increase can, for example, correspond to an edge of the workpiece. The direction of the measuring line through the expected contour path can be a direction from outside the workpiece to inside the workpiece, or vice versa. For example, the predetermined criterion can be a first intensity minimum or brightness minimum after a first intensity maximum or brightness maximum and/or after a first intensity increase or first brightness increase, relative to a direction of the measurement line. Such a criterion can be particularly suitable for determining a contour path of a joining edge close to the edge of a workpiece when the workpiece is a battery cell and the laser processing is laser welding, in which a lid of the battery cell is welded to a housing of the battery cell at a joining edge. Thus, the first brightness maximum and/or the first brightness increase can correspond to an edge of the housing, and the first brightness minimum occurring thereafter can correspond to a joining edge between the edge of the housing and the lid.

The contour point for the respective measuring line can be determined by an intensity analysis and/or grey value analysis of the recorded image along the measuring line, i.e. the line profile along the measuring line. The intensity analysis and/or grey value analysis can be based on the aforementioned criterion. In particular, the contour point for the respective measuring line can be determined by an intensity analysis and/or grey value analysis of the line profile, i.e. the image data along the measuring line, using the specified criterion.

For example, a contour point for a measuring line can be determined by analysing the line profile along the measuring line, i.e. by evaluating a one-dimensional line profile that has been extracted along the measuring line arranged in the recorded image.

The contour point for the respective measuring line can be determined by analysing the line profile along the measuring line. This means that the contour point can be determined using a one-dimensional line profile extracted from the recorded image at the respective measuring line. The line profile can, for example, be a one-dimensional (1D) grey image, grey value profile or grey scale profile or a one-dimensional (1D) intensity profile. The line profile can, for example, comprise a series of data points or image data. The data points can each specify a grey value or intensity value. The line profile can, for example, comprise several brightness levels, intensity levels and/or a varying proportion of white. The line profile can be extracted from the image along the measuring line and comprise image data along the measuring line. Extraction can also be referred to as sampling (scanning). The one-dimensionality of the line profile is related to the respective direction of the measuring line. A position and/or orientation of the corresponding measuring line can be assigned to the line profile.

The contour point for a measuring line can, for example, be determined using the one-dimensional line profile extracted from the recorded image at the respective measuring line and using the specified criterion.

In embodiments, the method can comprise post-processing of the line profile, in particular by means of a filter. Post-processing can take place after extracting the line profile and/or before determining the contour point. The filter can be, for example, an edge filter, a gradient filter, a contrast-enhancing filter and/or a noise filter or smoothing filter. In this case, it is advantageous that post-processing is only performed on the line profile and thus differs from conventional complex, two-dimensional edge detection by analysing the image in a two-dimensional image.

In embodiments, an index of the contour point is determined along the measuring line or along the line profile. The index may also be referred to as a coordinate or data index of the measuring line or line profile. The index can indicate a position of the contour point on the respective measuring line. The index can therefore be a one-dimensional position value that indicates the position along the measuring line. The index enables fast data processing.

For example, the result of determining the desired position of the contour point can initially be available as an index, which can then be used to calculate the image coordinates of the contour point. The index can, for example, be determined in relation to the centre point of the measuring line or line profile or in relation to one end of the measuring line or line profile, wherein the measuring line or line profile in particular has a first end (a start) and a second end.

In particular, the contour point for the respective measuring line can be determined using a one-dimensional line profile extracted from the recorded image at the respective measuring line, and an index of the contour point in the line profile can be determined for the respective measuring line or the respective line profile. The index of the contour point is thus an index along the measuring line and along the line profile. In particular, the index of the contour point in the line profile may be the number of the data point of the line profile, wherein the line profile comprises a series of data points.

The method may include: transforming the index of the contour point into the contour point, in particular transforming the index of the contour point into image coordinates or into system coordinates. This can be done, for example, based on parameters of the measuring line, for example based on a position and an angle of the measuring line.

Alternatively, an image coordinate pair of the contour point can be determined by analysing the line profile along the measuring line. The image coordinate pair of the contour point can characterise a position of the contour point in the recorded image.

The expected contour path may be or comprise a curved contour path and/or a non-rectilinear contour path and/or a (fully) circumferential contour path. The contour path may be closed. By placing the measuring lines in the recorded image through the expected contour path of the workpiece, the expected contour path and/or the actual contour path may also comprise a curve or curvature. In embodiments, the expected contour path comprises a curvature. In embodiments, the plurality of measuring lines comprises measuring lines in different orientations and/or alignments.

Determining at least a portion of the actual contour path or a partial contour path of the actual contour path may be performed before controlling the scanning device to position the laser beam for laser processing based on that portion or that partial contour path of the actual contour path. In other words, at least part of the actual contour path of the workpiece is determined before laser processing according to several contour points, in particular according to several contour points of an image. In particular, an entire actual contour path of the workpiece can be determined prior to laser processing. The actual contour path can thus be determined for a plurality of determined contour points before the scanning device is controlled to position the laser beam for laser processing based on this determined actual contour path.

In embodiments, each measuring line can run normally through the expected contour path and/or intersect the expected contour path. This simplifies the determination of the position of the contour point along the measuring line. In particular, for example, the variation of an intensity or a grey value along the measuring line caused by the contour being searched for can be particularly clear when the measuring line essentially intersects the expected contour path normally. For example, the measuring line can run across the expected contour path. A measuring line that runs normally through a straight portion of the expected contour path intersects this portion orthogonally (at right angles) or perpendicularly.

In the image recorded with the camera, the image information is available in image coordinates. The image coordinates can also be referred to as pixel coordinates. However, the scanning device for positioning the laser beam is usually controlled in relation to scanner coordinates or system coordinates. These can also be referred to as processing coordinates, real coordinates or world coordinates. The system coordinates can be system coordinates of a laser processing system, which comprises the scanning device. A transformation from image coordinates to system coordinates can, for example, take into account and/or (at least partially) correct or compensate for optical distortions of the camera and/or an optical system in the beam path of the camera. The optical distortions taken into account and/or corrected/compensated may include chromatic aberration, perspective distortions, distortions of an f-theta lens, distortions of a camera lens and/or mechanical misalignments. In particular, the transformation can be a non-linear coordinate transformation.

A transition between the coordinate systems, in particular from image coordinates to system coordinates, can take place at various steps of the process or the transformation can be applied to various elements, e.g. partial contour gradients, contour points or images. This is explained below using examples.

In one example, the individual contour points can be transformed from image coordinates into system coordinates. For example, the measuring lines can be related to image coordinates of the recorded image; for the respective measuring line, the contour point can be determined in image coordinates, i.e. an image coordinate pair of the contour point, for example based on an index of the contour point; the contour point in image coordinates can be transformed into system coordinates, and the actual contour course can be determined based on the transformed contour points (contour points in system coordinates), i.e. in relation to the system coordinates.

In another example, the individual contour points can be calculated directly in system coordinates. For example, the measuring lines can be related to the image coordinates of the recorded image; the contour point for the respective measuring line can be determined in relation to the system coordinates, for example based on the index of the contour point; the actual contour path can be determined based on the contour points, i.e. also in relation to the system coordinates.

In another example, a contour path determined in image coordinates can be transformed into the actual contour path in system coordinates. For example, the measuring lines can be related to the image coordinates of the recorded image; the contour point for the respective measuring line can be determined in image coordinates, for example based on the index of the contour point; a contour path (in particular a continuous contour path) can be determined based on the contour points in image coordinates, i.e. related to the image coordinates; and this contour path in image coordinates can be transformed into the actual contour path in system coordinates.

In another example, the recorded image or part of the image or a cross-section of the image can be transformed from image coordinates to system coordinates. The result of such a transformation can be a rectified image or part of the image in which each pixel corresponds to a predefined coordinate in system coordinates. For example, the measuring lines can be related to the system coordinates of the transformed captured image; the contour point for the respective measuring line can be determined in relation to the system coordinates; and the actual contour path can be determined based on the contour points in system coordinates, i.e. also in relation to the system coordinates.

In particular in a case in which the workpiece or the expected contour path has a larger extent than a field of view of the camera, the method can comprise recording several images of different regions of the workpiece with the camera in order to determine the actual contour path from this. Various examples are explained below. The contours detected in the individual images can thus be combined to finally determine the actual contour path.

This can be achieved with the described transformations of image coordinates into system coordinates, in particular when the individual images cannot be combined using translation and rotation transformations alone due to optical distortions.

For example, the method can comprise: recording multiple images of different regions of the workpiece with the camera; determining one contour point for each measuring line of a plurality of measuring lines laid through an expected contour path of the workpiece in each recorded image; and determining the actual contour path of the workpiece based on the determined contour points from all images. Here, for example, the contour points can be transformed into system coordinates or determined directly in system coordinates, and the actual contour path of the workpiece is determined based on the determined contour points from all images.

The method can comprise: recording a multiple images of respective different regions of the workpiece with the camera; determining one contour point for each of a plurality of measuring lines laid through an expected contour path of the workpiece in each recorded image; determining a partial contour path based on the determined contour points for each of the images; and merging the partial contour paths of all the images into the actual contour path. Here, the contour points can be transformed into system coordinates for each of the images or calculated directly in system coordinates. The partial contour course is, for example, a continuous partial contour course. The partial contour paths can also be referred to as sub-contour paths.

In other examples, the method comprises: recording a multiple images of respectively different regions of the workpiece with the camera; merging the images to form an overall image; determining one contour point for each measuring line of a plurality of measuring lines that are laid through an expected contour path of the workpiece in the overall image; and determining the actual contour path of the workpiece based on the determined contour points. Here, for example, the images can be transformed from image coordinates into system coordinates, and the transformed images are combined to form the overall image.

The transformation of the images is typically a non-linear coordinate transformation, as explained above.

In the methods described, the different regions of the workpiece may overlap (i.e. have an overlapping area) and/or be contiguous, for example directly adjacent to each other.

In case the object or workpiece and/or the expected contour path has a larger extension than the camera's field of view, the galvanometer (the scanning device) can, for example, be positioned or controlled in such a way that the camera sees a different part of the object each time. The (camera) view can overlap with a previous (camera) view so that the measured contour overlaps with the previously measured contour. This ensures that the entire object is measured. The two contours (or contour paths) can be merged by determining and removing the overlapping segment of the contours (or contour paths).

For example, at least a first image and a second image of the multiple images may overlap in an overlapping area. For example, a partial contour path of the first image and a partial contour path of the second image can be merged, wherein segments of the partial contour paths that intersect or overlap along the partial contour paths are replaced by a single partial contour path segment. The partial contour course segment can be determined, for example, by interpolating the segments or by projecting the contour points of one partial contour course onto the other partial contour course or by selecting one of the segments. For example, a segment of one of the first or second partial contour course, which overlaps with the segment of the other of the first or second partial contour course, can be removed.

According to a further development of the invention, the method comprises: Analysing the captured image in order to arrange the predetermined or expected (e.g. stored) contour course in the image. Thereby, the requirements for positioning the workpiece to be processed can be relaxed, wherein high-precision laser processing along the actual contour path is still possible. Analysing the recorded image can include, for example, determining an orientation and/or a position of the workpiece based on the recorded image of the workpiece, in particular by image processing. For example, the expected contour path can be arranged in the image taking into account the determined orientation and/or position of the workpiece. High precision is not required here, as the exact contour path is subsequently determined using the measuring lines. This makes it possible to save computing power.

In embodiments, the method can include pre-processing of the recorded image, in particular using a filter. For example, an edge filter or gradient filter can be applied, e.g. a Sobel filter. For example, the filter can be used to detect or emphasise an edge feature of the workpiece, calculate a 2D gradient, suppress noise by smoothing, or emphasise certain features and/or edges by convolution or correlation.

In embodiments, the detected contour path or sub-contour path can be processed. For example, the contour points can be smoothed by a low-pass filter and/or fitted against a predefined, arbitrary shape, e.g. circle, ellipse, hexagon etc. . . . For example, the contour points can be shifted by a constant offset along the measuring line. The scanning device can then be controlled based on the actual contour path processed.

Laser processing can include laser welding, laser cutting, laser cleaning or laser drilling.

One main application is laser welding.

The actual contour path can be a path of an outer edge of the workpiece or a welding edge or joining edge on the workpiece along which the laser processing is to be carried out by means of the laser beam.

One field of application in which the invention offers a great advantage is battery cell welding, in particular round cell welding or lid-container welding (lidcan welding) of cylindrical or prismatic battery cells. In a preferred embodiment, the workpiece is a battery cell and the laser processing is laser welding, for example to weld a lid of the battery cell to a housing of the battery cell at a joining edge. Here, the actual contour path can be a path of the joining edge of the battery cell. The joining edge can, for example, be a circumferential joining edge, and the actual and/or the expected contour path can be a (completely) circumferential contour path. The contour course can therefore be closed.

According to a further aspect of the invention, a laser processing system for laser processing a workpiece by means of a laser beam is provided, the laser processing system comprising: a scanning device for positioning the laser beam in a scanning field; a camera for recording an image of the workpiece, wherein the beam path of the camera is coupled coaxially into a beam path of the laser beam and runs together with the beam path of the laser beam via the scanning device; and a control device for receiving an image of the workpiece taken by the camera and for controlling the scanning device to position the laser beam for laser processing, wherein the control device is arranged to perform the method.

The beam path of the camera can thus be positioned to different positions in the scanning field by the scanning device.

In summary, the invention relates generally to the use of machine vision or image processing in laser material processing, and more specifically to the visual determination of a laser processing trajectory, in particular for objects (workpieces) of any shape and/or for objects that are larger than the field of view. The invention addresses a class of problems that have not yet been solved by commercial systems available on the market. The invention opens up a new and flexible way to dynamically determine the laser processing trajectory and increases the precision of a laser scanning system. The fact that the entire geometry of the workpiece or workpiece area can be measured instead of just determining the position of the workpiece means that manufacturing tolerances can be reduced. This leads to a reduction in costs. The new approach to image processing, in particular the extraction of a contour from individual images and the use of line profile analysis to detect a local maximum, leads to a significant improvement in speed compared to conventional image processing techniques. In certain applications, the new approach shows a 100-fold improvement in speed compared to conventional techniques such as the Hough transform, while maintaining a better recognition rate.

BRIEF DESCRIPTION OF THE DRAWINGS

The invention is described in detail below with reference to figures.

DETAILED DESCRIPTION OF THE DRAWINGS

In the following, unless otherwise noted, the same reference signs are used for identical and similarly acting elements.

Figure 1:
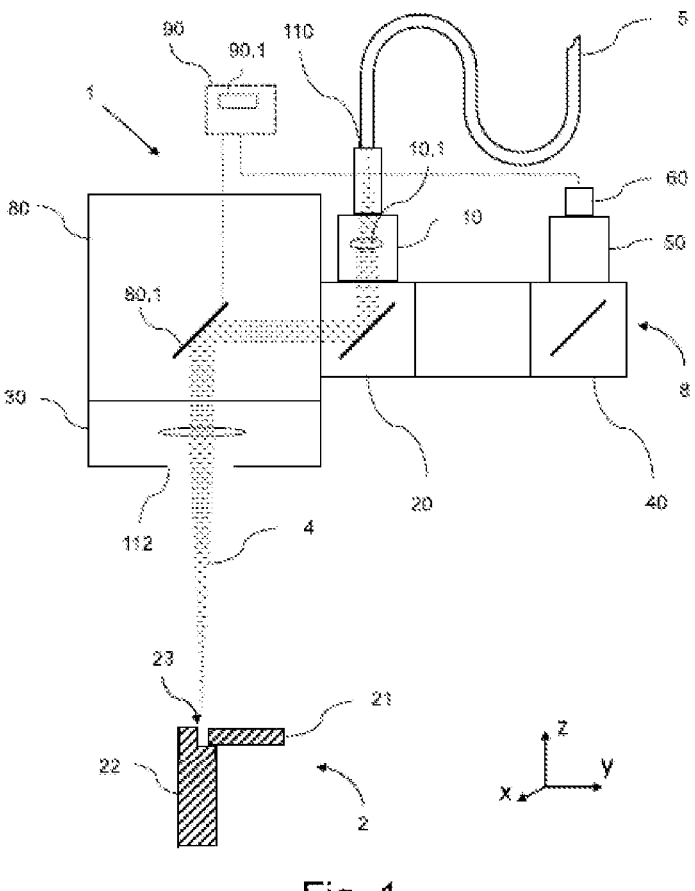
FIG. 1 is a schematic representation of a laser processing system for laser processing a workpiece by means of a laser beam according to embodiments of the invention.

FIG. 1 shows a schematic representation of a laser processing system for laser processing a workpiece 2 by means of a laser beam 4 according to embodiments of the present disclosure. The laser processing system comprises a laser processing head 1.

The laser processing head 1 is arranged to focus or bundle a laser beam 4 emitted from a laser light source or an end of a laser guide fibre 5 onto a workpiece 2 to be processed by means of collimating and focusing optics 10, 30, thereby performing a machining or a machining process. The processing can include, for example, laser cutting, soldering, welding or drilling. Laser welding is described below as an example.

The laser processing head 1 comprises a scanning device 80 in the form of a scanner module, e.g. a 2D Galvano scanner, with one or more deflection mirrors 80.1 for deflecting the laser beam 4 and for positioning the processing point of the laser beam 4 in the x-direction and y-direction. The laser light entering the laser processing head 1 through an entry opening or entry port 110 is collimated by a collimating optic 10, deflected several times and focused on the workpiece 2 by a focusing optic 30, for example an F-theta lens. The focused laser beam 4 emerges from a housing of the laser processing head 1 through an exit opening, e.g. a nozzle opening, 112.

The laser processing head 1 comprises a camera module 8 with a camera 60, e.g. a grey-image camera. The camera 60 may comprise a light-sensitive image sensor. The camera module 8 may further comprise, for example, a steering module 40 and/or a camera lens 50.

The laser processing head 1 further comprises coupling optics 20, arranged for coaxial coupling of the beam path of the camera 60 into the beam path of the laser beam 4, so that the beam path of the camera 60 runs together with the beam path of the laser beam 4 via the scanning device 80. The coupling optics 20 can, for example, be designed as a beam splitter or dichroic mirror (deflecting mirror). For example, the coupling optics 20 is arranged to deflect the laser beam 4 and is permeable to a wavelength range of light from the field of view of the camera 60 observed by the camera 60. Of course, in a reverse case, the laser light 4 can pass through the coupling optics 20 and the light to be observed by the camera 60 can be deflected. The workpiece 2 is arranged in the field of view of the camera 60. The steering module 40 directs the light coupled from the coupling optics 20 to the camera 60 onto the sensor of the camera 60.

The collimation optics 10 and the focusing optics 30 can be part of an optical system for adjusting the focus position of the laser beam 4 in the z-direction. By adjusting an optical element 10.1 of the collimation optics 10 in the beam direction of the laser beam 4, the focus position of the laser beam 4 resulting after the focusing optics 30 can be adjusted in the z-direction. The camera lens 50 can be arranged to adjust the focusing depth of the camera 60 to the surface of the workpiece 2 or to the height of the contour of the workpiece 2 to be processed.

The laser processing head 1 comprises a control device 90 for controlling the scanning device 80 for positioning the laser beam 4 for laser processing. The control device 90 is further arranged to receive an image of the workpiece 2 recorded by the camera 60. The control device 90 can be arranged in or on the laser processing head and/or connected to the laser processing head via cable or wirelessly for data exchange.

In the example shown, the workpiece 2 is a battery cell with a lid 21 and a housing 22, which are to be welded at a circumferential joining edge 23.

Figure 2A:
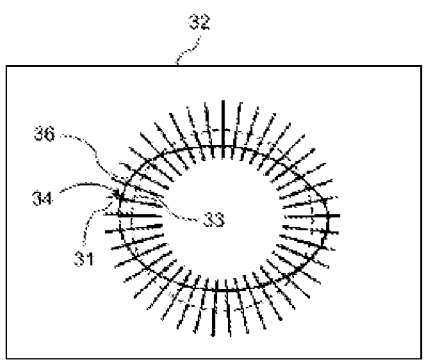
FIG. 2A schematically shows the determination of an actual contour path of a workpiece by means of measuring lines which are laid through an expected contour path in an image.
Figure 2B:
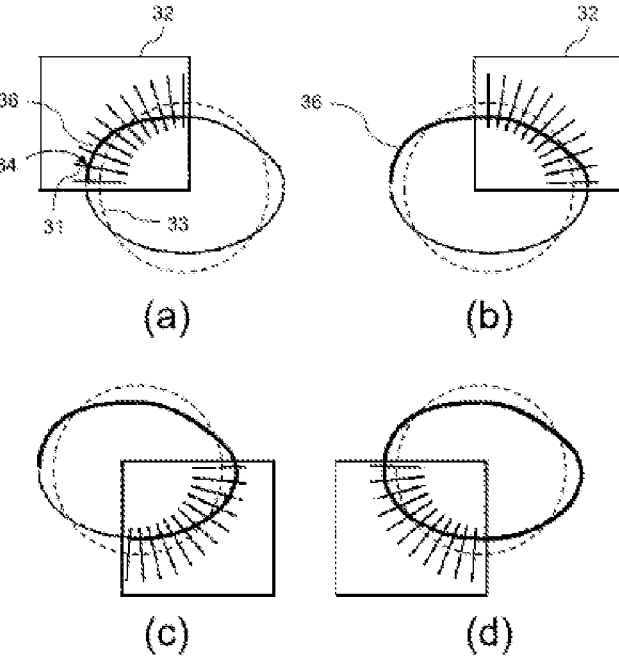
FIG. 2B schematically shows the determination of an actual contour path of a workpiece by means of measuring lines which are laid through an expected contour path in several images of different regions of the workpiece.
Figure 3:
FIG. 3 shows a schematic diagram of a line profile along a measuring line.
Figure 3:
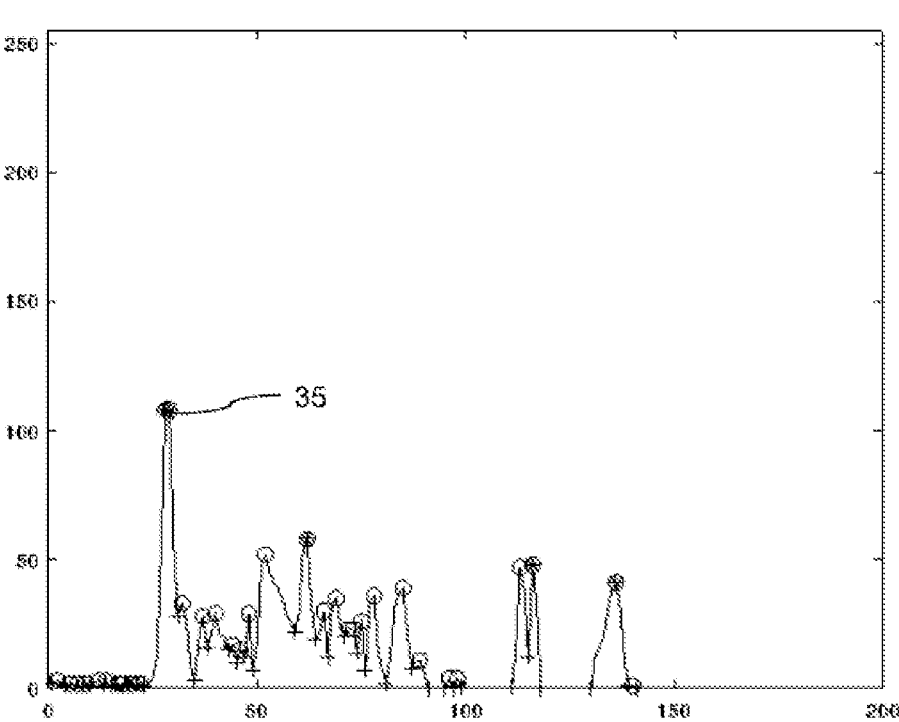

FIGS. 2B(a) to 2B(d) show schematically the determination of an actual contour path 36 of a workpiece 2 by means of measuring lines 31 which are laid through an expected contour path 33 in one or more images 32, according to embodiments of the invention. Of course, the determination of an actual contour path 36 of a workpiece 2 can also be based on an image 32 which contains an entire expected contour path 33, wherein in this image 32 measuring lines 31 are laid through the expected contour path 33 in each case, as shown in FIG. 2A. FIG. 3 shows, by way of example, a diagram of a line profile extracted along a measuring line 31 from the corresponding image 32.

According to the present disclosure, an object or workpiece 2 to be processed by the laser beam 4 may first be placed in the scan field or processing field of the laser processing head 1. The measuring process for determining the actual contour path then takes place. First, the scanning device 80 (e.g. a galvanometer scanner or galvo scanner) is moved to a position where a part or region of the workpiece 2 is visible to the coaxial camera 60. Line profiles are then sampled or extracted along measuring lines 31 from the recorded image 32, for example in each case along a direction normal to the predetermined or expected contour path 33. The predetermined or expected contour path 33 can be the approximate shape of the workpiece 2 or a feature of the workpiece 2 and specifies where the measuring lines 31 are to be arranged or where the line profiles are to be sampled for the geometry measurement. The line profile may be a 1D grey value profile and is sampled at a plurality of positions on the expected contour path 33, wherein a stack of 1D line profiles is ultimately generated. The raw image from the camera 60 can be pre-processed prior to sampling. The sampled line profiles may also be post-processed. For example, it may be desired to detect an edge feature of the object or workpiece 2. In this case, the image can be pre-processed, e.g. using a gradient filter such as the Sobel filter. Once the stack of line profiles has been generated, locations or positions of the object can be determined by analysing each line profile. An example of this would be finding the first local maximum of each profile and returning a vector of the first local maximum of all profiles (e.g. a vector of indices, wherein each index indicates the location of the feature being searched for in that line profile). In this example, the contour point 34 would be the location of the first local maximum on the measuring line 31. Once the indices of the local maxima of the 1D line profiles (i.e. all contour points 34) have been determined, the measured contour of the object can be calculated in pixel coordinates. The conversion of the measured contour in pixel coordinates to scanner coordinates (or system coordinates) can then be carried out easily. These scanner coordinates are used for laser material processing, wherein these scanner coordinates are the basis for positioning the laser tool centre point (laser TCP, tool center point) at the desired position.

Figure 4:
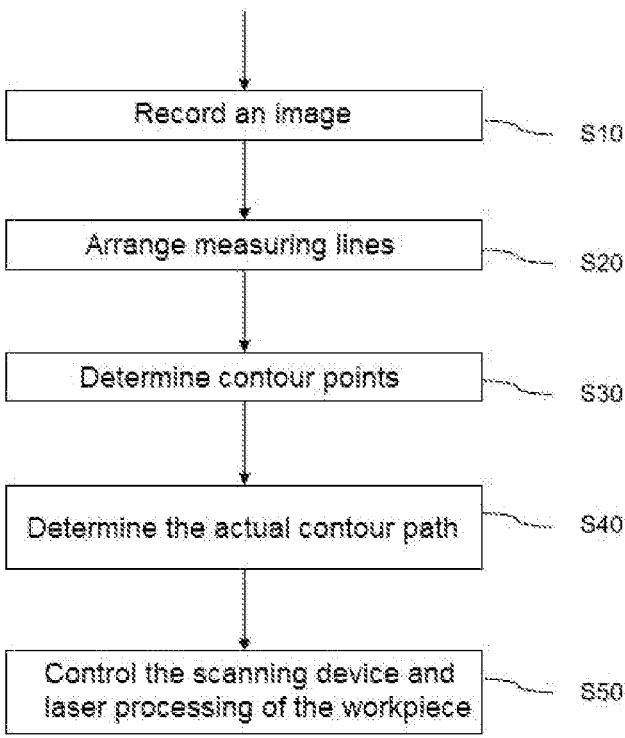
FIG. 4 to FIG. 8 each show a flow diagram of a respective method for laser processing a workpiece according to embodiments of the invention.

With reference to FIG. 2 and FIG. 4, the sequence of a method for laser processing a workpiece by means of a laser beam according to embodiments is described in more detail below.

An image 32 of the workpiece is recorded with the camera 60 in step S10. The beam path of the camera 60 is coaxially coupled into the beam path of the laser beam 4 and runs together with the latter via the scanning device 80. The captured image 32 is analysed by the control device 90 as follows.

In the recorded image 32, a plurality of measuring lines 31 are laid through an expected contour path 33 of the workpiece in step S20. As shown in FIG. 2B(a) to 2B(d), the image 32 can show a portion of the expected contour path 33 or the entire expected contour path 33, as shown in FIG. 2A. For this purpose, the expected contour path 33 can first be read from a memory 90.1 of the control device 90 and the image 32 can be analysed in order to arrange the expected contour path 33 in the image 32.

In FIG. 2B(a), the image 32 comprises a first region of the workpiece 2. In FIG. 2B(a), the image 32 shows an upper left region of the workpiece in the top view of the workpiece, in which an upper left quarter-circle section of the workpiece contour is expected. The measuring lines 31 are placed in the image at a distance from each other in such a way that each measuring line intersects the expected contour path 33 and runs essentially normal to the expected contour path 33. The expected contour path is finely scanned using the measuring lines. For example, 300 measuring lines can be used for an expected contour path in the form of a circle with a diameter of 46 mm.

A contour point 34 is determined for each of the measuring lines 31 in step S30. For this purpose, a one-dimensional line profile can be extracted from the recorded image 32 along a relevant measuring line 31. Such a line profile is shown as an example in FIG. 3. FIG. 3 shows the intensity or the grey value (in any unit) of each data point of the line profile above the number or index of the data point. The line profile is obtained e.g. by sampling the image 32 along the measuring line 31. The portion of the line profile on the left in FIG. 3 corresponds to a region outside the workpiece. Here the intensity or grey value is approximately zero. At the edge contour or edge of the workpiece, the intensity or grey value increases to a first maximum 35. For example, by analysing the line profile using the criterion "first maximum from the outside", the detected maximum 35 is determined as the position of the actual contour path 36 on the measuring line 31. In other words, the actual contour path 36 in image 32 intersects the measuring line 31 at the detected position. This position is determined as contour point 34.

Based on the determined contour points 34 to the measuring lines 31, the actual contour path 36 of the workpiece is determined in step S40. For this purpose, linear interpolation is performed between the discrete contour points 34, for example, or intersection points of the expected contour path 33 with the measuring lines 31 are shifted to the determined contour points 34 on these measuring lines 31 with minimal change in shape of the expected contour path 33 (i.e. minimal deviation of the determined actual contour path 36 from the expected contour path 33). The method described can be used to determine an actual contour path 36 that may deviate from the expected, ideal contour path 33, as shown schematically in FIG. 2B(a).

Based on the determined actual contour path 36, the scanning device 80 is then controlled in step S50 during laser processing of the workpiece in order to position the laser beam 4 for laser processing. For example, the determined actual contour path 36 can be used as the laser processing trajectory for controlling or regulating the processing position of the laser beam 4 on the workpiece.

The contour points 34 can be calculated in image coordinates (or pixel coordinates). The actual contour path 36 can also first be determined in the image coordinate system and then transformed into the system coordinate system. Alternatively, the contour points 34 can be transformed into the system coordinate system and the actual contour path 36 can be determined on this basis.

As explained above, the contour point 34 for the respective measuring line 31 can be determined by an intensity analysis or grey image analysis of the extracted line profile and thus by intensity analysis or grey image analysis of the recorded image 32 along the measuring line 31. The position of the contour point 34 is determined during the analysis of the line profile as the number or index of the data point of the line profile. Based on the position and orientation of the measuring line 31 in the image 32, the contour point 34 is then calculated, for example in image coordinates. For controlling the scanning device 80, the actual contour path 36 is transformed into system coordinates (e.g. scanner coordinates) of the laser processing system.

In the example of the line profile of FIG. 3, the actual contour path 36 is a path of an outer edge of the workpiece along which laser processing is to be carried out by means of the laser beam 4. Instead of a first (local) maximum, the respective line profile can be suitably evaluated with another criterion such as "first minimum after the first maximum from the outside" in order to determine, for example, an actual contour path 36 in the form of a welding edge or joining edge on the workpiece 2 (see workpiece in FIG. 1).

The method described is carried out by the control device 90. Before evaluating the recorded image 32, this can pre-process the image, for example by means of a filter. The control device 90 can also post-process the respective line profile before determining the relevant contour point, for example by means of a filter.

Further embodiments are described below with reference to FIGS. 5 to 8. In each of these embodiments, parts of the process are carried out several times, for example for different images of different regions of the workpiece. The different regions of the workpiece can overlap, as shown schematically in FIG. 2: In FIG. 2B(a), the image 32 comprises a first region of the workpiece. In FIG. 2B (b), the image 32 comprises a second region of the workpiece that overlaps with the first region. In all other respects, the respective methods correspond to the method according to FIG. 4, wherein differences are explained below.

Figure 5:
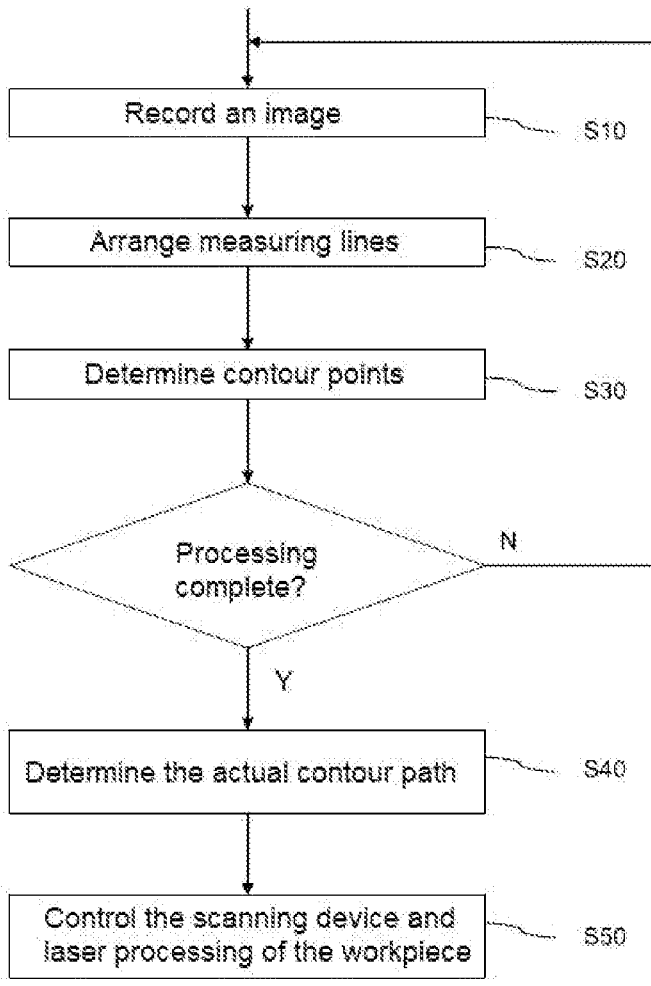

FIG. 5 shows a flow diagram of a method for laser processing a workpiece, in which the step S10 of recording an image 32, the step S20 of arranging a plurality of measuring lines 31 in the respective recorded image 32, and the step S30 of determining a respective contour point 34 for each measuring line 31 are repeatedly performed until the various regions of the workpiece completely cover the expected contour path 33 and the processing of the images 32 by determining the contour points has been completely performed. For example, in step 10, as shown in FIG. 2, four images are recorded with the camera 60, each for different regions of the workpiece, in step S20 measuring lines 31 are laid through an expected contour path 33 in each image 32 and in step S30 a contour point 34 is determined for each measuring line 31.

In step S40, the actual contour path 36 is then determined based on the determined contour points 34 of all images 32. This can be done in system coordinates, for example by first transforming the contour points 34 from image coordinates into system coordinates. Alternatively, the actual contour path 36 can be determined in image coordinates and then transformed into the system coordinate system. In step S50, the scanning device 80 is controlled for laser processing of the workpiece.

Figure 6:
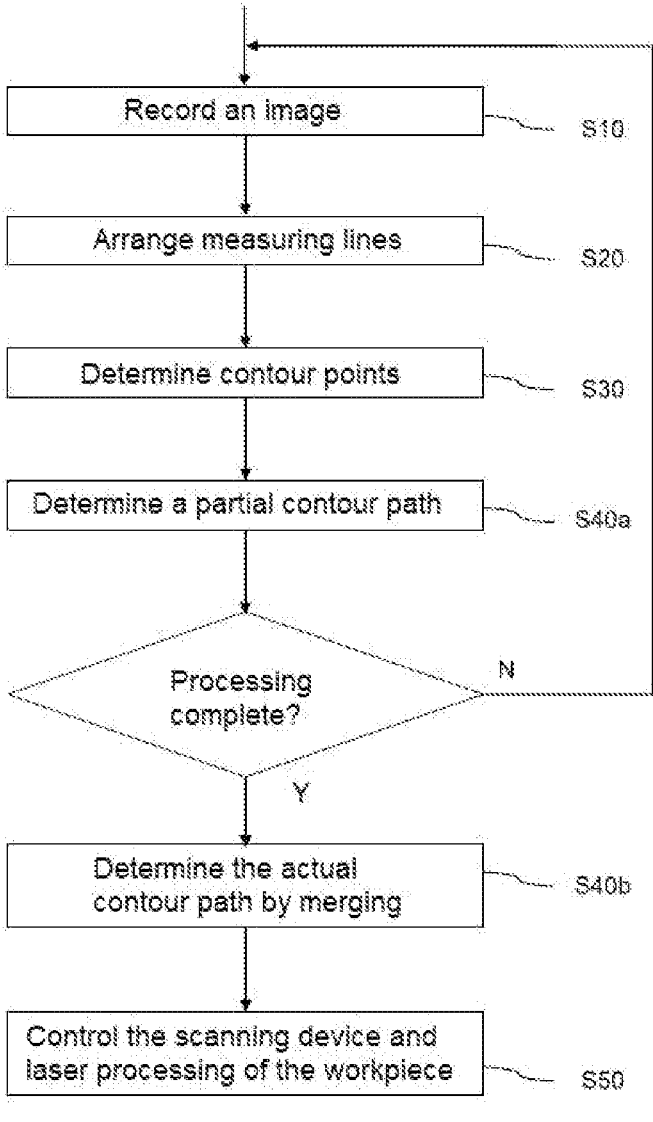

FIG. 6 shows a flow diagram of a further method for laser processing a workpiece. This method differs from the method of FIG. 5 in particular in that for each recorded image 32, after step S30 of determining the contour points 34 in step S40a, a partial contour profile is determined based on the determined contour points 34 in the respective image 32. As illustrated in FIGS. 2B(a) to 2B(d), a partial contour path can be determined for each image 32 as a portion of the actual contour path 36. The partial contour paths of the individual images 32 can be combined in step S40b to form the actual contour path 36. Thus, the actual contour path 36 is determined by merging the partial contour paths. In step S50, the scanning device 80 is then controlled and the workpiece is processed by laser based on the actual contour path 36 determined.

A transformation of image coordinates into system coordinates takes place, for example, after determining the respective contour points 34 for an image 32, wherein the partial contour path is then determined in system coordinates. Alternatively, the partial contour paths can also be determined in the image coordinate system and transformed into the system coordinate system before or after merging into the actual contour path 36.

Figure 7:
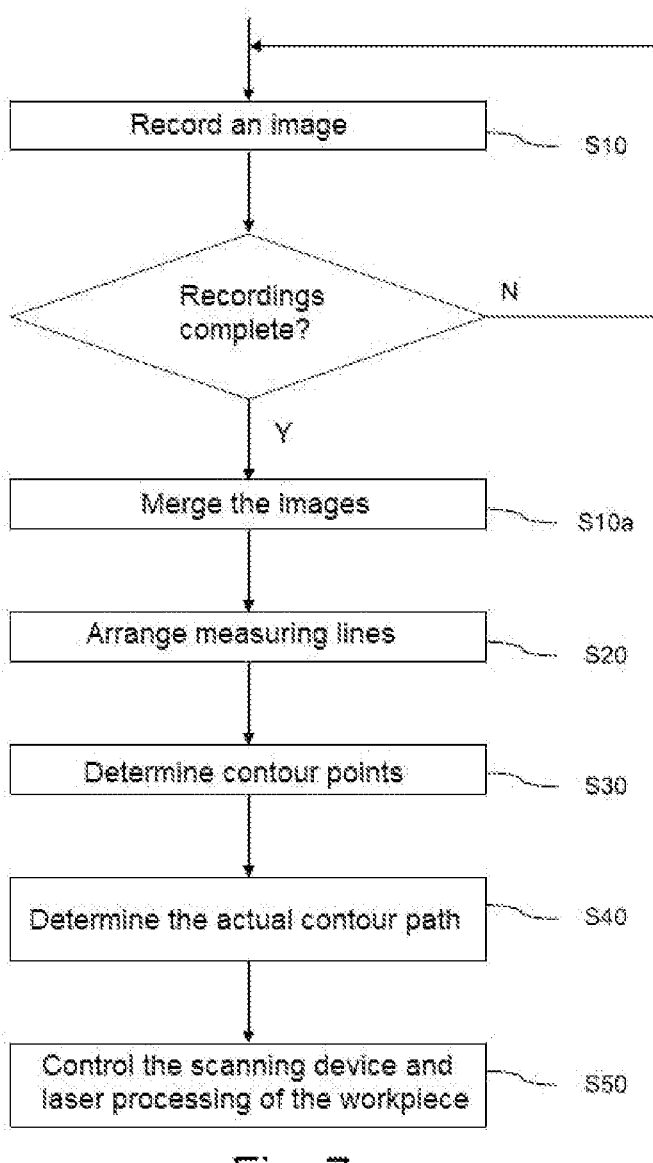

FIG. 7 shows a flow diagram of another method for laser processing a workpiece. The method differs from the method of FIG. 4 in particular in that several images 32 of different regions of the workpiece are first recorded with the camera 60. The step S10 of recording an image 32 can be repeated until a predetermined workpiece area is covered or imaged which contains the expected contour path 33.

In a step S10a, the images 32 are then combined to form an overall image. This can take place before or after transformation of the images 32 from image coordinates to system coordinates.

Steps S20 to S50 then follow as in the method according to FIG. 4, but for the merged overall image instead of the individual image 32: the measuring lines 31 are arranged in the overall image (step S20), a contour point 34 is determined for each measuring line 31 (step S30), the actual contour path 36 is determined from the determined contour points 34 (step S40), and the scanning device 80 is controlled for laser processing of the workpiece (step S50).

Figure 8:
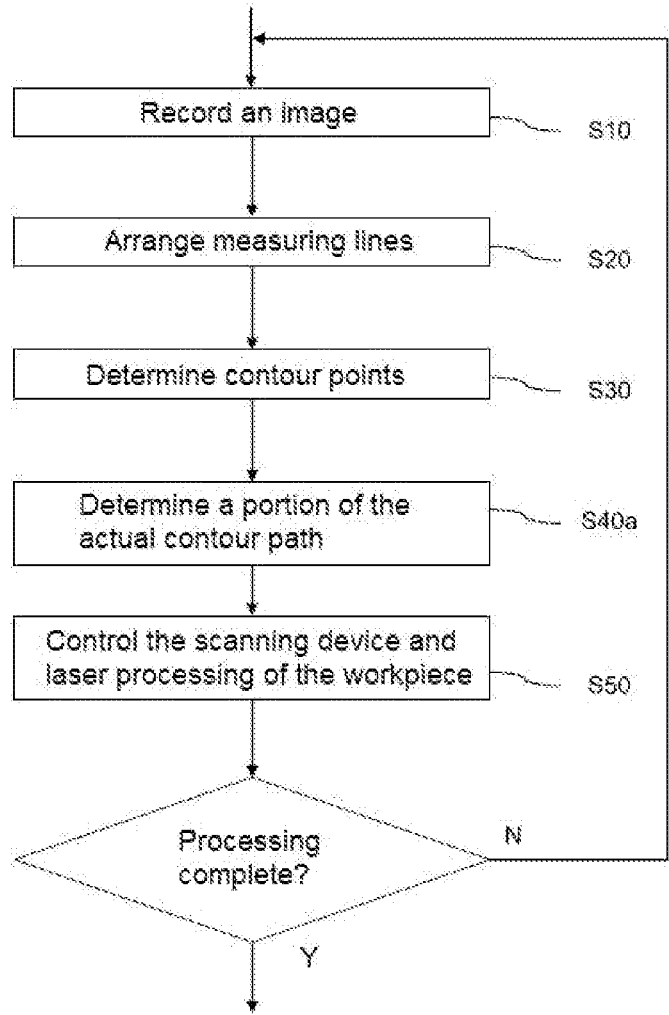

FIG. 8 shows a flow diagram of a further method for laser processing a workpiece, wherein the method is a variant of the method according to FIG. 6. The actual contour path 36 is determined here section by section and used as a basis for controlling the scanning device 80 for positioning the laser beam 4 for laser processing. After the contour points 34 have been determined for a respective image 32 in step S30, a portion of the actual contour path 36 is determined in step S40a based on these contour points 34. This corresponds to determining a partial contour course. The scanning device 80 is then controlled in step S50 to position the laser beam 4 for laser processing, based on this portion of the actual contour path 36. This portion of the actual contour path 36 can be referred to as a partial laser trajectory. The steps of the method are then repeated, starting with the step S10 of recording the next image 32 of a next different region of the workpiece with the camera, until the different regions of the workpiece completely cover the expected contour path 33 and the processing of the images and also the laser processing of the actual contour path 36 is completely performed.

According to the present disclosure, a laser trajectory (complete or partial) can be determined visually or optically for workpieces of any shape and/or with a size larger than the field of view of the camera. In particular, the disclosure can be advantageously used in a welding process of battery cells, e.g. a lid welding process of cylindrical or prismatic battery cells.

LIST OF REFERENCE SIGNS

1 Laser processing head
2 Workpiece
4 Laser beam
5 Laser guide fibre
8 Camera module
10 Collimation optics
10.1 Optical element
20 Coupling optics
21 Lid
22 Housing
23 Joining edge
30 Focusing optics
31 Measuring line
32 Image
33 Expected contour path
34 Contour point 35 First maximum
36 Actual contour path
38 Line profile
40 Steering module
50 Camera lens
60 Camera
80 Scanning device
80.1 Deflecting mirror
90 Control device
90.1 Memory
110 Inlet opening
112a Exit opening
S10 Process step "Recording an image"
S10a Process step "Merging the images"
S20 Process step "Arranging measuring lines"
S30 Process step "Determining contour points"
S40 Process step "Determining the actual contour path"
S40a Process step "Determining a partial contour course"
S40b Process step "Determining the actual contour path by merging"
S50 Process step "Controlling the scanning device and laser processing of the workpiece"

The invention claimed is:

1. A method for laser processing a workpiece by a laser beam, the method comprising the steps of:
   recording an image of the workpiece with a camera, a beam path of the camera being coupled coaxially into a beam path of the laser beam and running together with the beam path of the laser beam via a scanning device;
   determining a respective contour point for each measuring line of a plurality of measuring lines which are laid through an expected contour path of the workpiece in the recorded image;
   determining an actual contour path of the workpiece based on the determined contour points; and
   controlling the scanning device for positioning the laser beam for laser processing, based on the actual contour path.

2. The method according to claim 1, wherein determining of the contour point for the respective measuring line is carried out by an intensity analysis and/or grey image analysis of the recorded image along the measuring line.

3. The method according to claim 1, wherein the contour point for the respective measuring line is determined on a basis of a one-dimensional line profile extracted from the recorded image at the respective measuring line.

4. The method according to claim 3, further comprising post-processing the line profile.

5. The method according to claim 4, wherein the post processing is by a filter.

6. The method according to claim 1, wherein an index of the contour point along the measuring line is determined for the respective measuring line.

7. The method according to claim 1, wherein determining of at least a portion of the actual contour path or a partial contour path of the actual contour path takes place before controlling of the scanning device for positioning the laser beam for laser processing takes place based on this portion or partial contour path of the actual contour path.

8. The method according to claim 1, wherein each measuring line passes normally through the expected contour path and/or each measuring line intersects the expected contour path.

9. The method according to claim 1, wherein:
   the recording an image comprises recording multiple images of respectively different regions of the workpiece with the camera;
   the determining a respective contour point comprises determining a respective contour point for each measuring line of the plurality of measuring lines which are laid through an expected contour path of the workpiece in each recorded image; and
   the determining an actual contour path comprises determining the actual contour path of the workpiece based on the determined contour point of all of the images.

10. The method according to claim 1, wherein:
    the recording an image comprises recording multiple images of respective different regions of the workpiece with the camera;
    the determining a respective contour point comprises determining a respective contour point for each measuring line of the plurality of measuring lines which are laid through an expected contour path of the workpiece in each recorded image;
    further comprising determining a partial contour path based on the determined contour points for each of the images; and
    merging the partial contour paths of all of the images to form the actual contour path.

11. The method according to claim 1, wherein:
    the recording an image comprises recording multiple images of respective different regions of the workpiece with the camera;
    further comprising merging the images into an overall image;
    the determining a respective contour point comprises determining a respective contour point for each measuring line of the plurality of measuring lines which are placed in the overall image by the expected contour path of the workpiece; and
    the determining the actual contour path of the workpiece is based on the determined contour points.

12. The method according to claim 9, wherein the different regions of the workpiece overlap and/or are adjacent to each other.

13. The method according to claim 1, wherein the method further comprises:
    analysing the recorded image to arrange the expected contour path in the image.

14. The method according to claim 1, further comprising pre-processing the recorded image.

15. The method according to claim 14, wherein the pre-processing is by a filter.

16. The method according to claim 1, wherein the laser processing comprises laser welding, laser cutting, laser soldering, laser cleaning or laser drilling.

17. The method according to claim 1, wherein the actual contour path is a path of an outer edge of the workpiece or a welding edge or joining edge on the workpiece along which the laser processing is to be carried out by the laser beam.

18. The method according to claim 1, wherein the workpiece is a battery cell and the laser processing is a laser welding, wherein a lid of the battery cell is welded to a housing of the battery cell at a joining edge, wherein the actual contour path is a path of the joining edge of the battery cell.

19. A laser processing system for laser processing a workpiece by a laser beam, the laser processing system comprising:

a scanning device for positioning the laser beam;

a camera for recording an image of the workpiece, wherein a beam path of the camera is coupled coaxially into a beam path of the laser beam and runs together with the beam path of the laser beam via the scanning device; and a control device for receiving the image of the workpiece recorded by the camera and for controlling the scanning device for positioning the laser beam for laser processing;

wherein the control device is configured to perform a method comprising the steps of:

recording the image of the workpiece with the camera;

determining a respective contour point for each measuring line of a plurality of measuring lines which are laid through an expected contour path of the workpiece in the recorded image;

determining an actual contour path of the workpiece based on the determined contour points; and controlling the scanning device for positioning the laser beam for laser processing, based on the actual contour path.

\*   \*   \*   \*   \*